Patented June 22, 1926.

1,589,598

UNITED STATES PATENT OFFICE.

DANIEL W. KESSLER, OF WASHINGTON, DISTRICT OF COLUMBIA.

TREATMENT OF CONCRETE FLOORS.

No Drawing.   Application filed May 13, 1922. Serial No. 560,722.

This invention relates to materials primarily intended for hardening and coloring cement and concrete floors, and comprises chemical solutions adapted to be applied to the floors after they have set ready for use or after they have been in use for a considerable time.

Heretofore it has been the practice to mix the hardening materials in the mortar before the floor is laid, likewise, to add coloring materials to the mortar, or the top dressing for giving the floor the desired color. According to the present invention, however, the finished floor is treated with chemical solutions which penetrate the pores of the concrete and react chemically to produce the color and harden the floor.

Further objects and details of the invention will appear as described in the process for carrying it out and hereinafter claimed.

In carrying out this invention, a 20% solution of equal parts of zinc sulphate and aluminum sulphate acidified with sulphuric acid has been most satisfactory. This solution is applied copiously with a white-wash brush and after twenty-four hours the floor may be given a second application of this solution in the same manner. Twenty-four hours after the last treatment with the sulphates solution a 5% solution of soft soap is applied to the floor; this is converted by the metallic sulphates which remain on the surface and in the pores near the surface into an insoluble soap or stearate which acts as a wax on the surface. The sulphates act as hardeners which bind the concrete surface into a harder and more durable mass. The stearate also imparts a beneficial quality to the floor in that it tends to hold dust particles that are worn from the floor by severe traffic and causes the floor to polish under use rather than become rough as is the case with untreated floors.

The process for coloring and hardening the floor is substantially the same as for the hardening process alone, as above set forth. In order to produce a green color in the surface of the concrete the treatment is as follows:

The floor is first treated with a solution of bicarbonate of soda in order to add more carbonate to the concrete; the floor may be given two coats at intervals of twenty-four hours. The hardener and coloring agent consists of a 20% solution of zinc sulphate, aluminum sulphate and copper sulphate in the proportions 1:1:2; this solution is also acidified with sulphuric acid, about a tenth of one per cent which has a tendency to keep the chemicals in solution. The first two sulphates act as hardeners and the copper sulphate is converted into a green carbonate of copper by the free carbonate from the soda treatment and that already in the concrete. The floor is finally given the soft soap treatment as in the former case.

The treatment for obtaining a brown or tan is the same as for green, except that the copper sulphate is replaced by sulphate of iron. The shade produced is dependent on the quality of the concrete under treatment, and may be varied according to the number of applications of the solution; a porous floor would require fewer applications in order to absorb the solution required to give a certain shade than a floor which is more dense.

The order of the various steps of the process as set forth has been found to give the best results; that is 1, the application of the carbonate solution, 2, the sulphates and 3 the soap.

Although there is normally a considerable amount of carbonate in the surface of the concrete floors made with Portland cement, the application of the carbonate solution is desirable and it is preferably applied before the sulphates as it does not fill the pores in the manner in which the sulphates do and will therefore penetrate deeper.

The application of the solution containing both the hardening and coloring chemicals has been found to give better results than their application separately. The sulphates of zinc and aluminum make an excellent waterproofing material in the surface as well as a hardener, thus preventing the entry of other chemicals as readily as they would penetrate in the absence of these sulphates. The copper sulphate and sulphate of iron in solutions applied to surfaces treated with carbonates give very pleasing green and brown colors in the surfaces, but when the hardening chemicals are used the best results have been obtained by applying the hardening and coloring chemicals together in one solution.

It is to be noted that the concrete contains free alkalis which convert the sulphate solutions to hydroxides to a limited extent, i. e., so far as the alkalis are reached by the sulphate solutions. However, a normal Portland cement contains only about 1% of alkali substances, and in the usual floor topping which is a 1:2 mortar this is reduced to ⅓ of 1%. The small amount of alkali substance which is reached by the solutions are neutralized without taking up a very appreciable amount of the sulphates which are applied in excess of the amount actually required. The color of the hydroxides so formed do not interfere with the results because in the case of iron they are brown and in the case of copper they are blue.

While the process is primarily adapted for cement or concrete, it will operate with other stone surfaces and that the color produced as hereinbefore set forth is due to the formation of carbonates is shown by treating a carbonate free material such as a stone of open texture or porous with the ferrous or copper sulphate. No appreciable color will be formed, but if the stone is first treated with a solution of sodium carbonate and then with the sulphate the color will form. Portland cement contains a considerable amount of free lime which becomes hydroxide of lime when the cement is mixed with water and the part of this which is near the surface of the finished concrete becomes carbonated due to the exposure to the air. Therefore a concrete surface can be colored by the sulphate solution alone but it is much improved by first applying the carbonate solution.

Finally the soap solution which is applied forms metallic soaps, etc., with the chemicals as set forth. A further treatment of the surface with kerosene, gasoline, or turpentine, etc., however has been found to dissolve some of the soap products and soap on the surface and that they will enter the surface to a greater depth.

The surface treated in this manner is water-proof and wear-resisting, even when the treatment has been given to sandy and very poor concrete floors.

Having thus disclosed the invention it is not desired that it should be limited to the specific details, as set forth, it being understood that various changes may be resorted to without departing from the spirit of the invention

What is claimed as the invention and is desired to be secured by Letters Patent is:—

1. The process which comprises the treating of open textured stone surfaces comprising the application of a carbonate solution thereto followed by the application of a chemical solution which will react with the carbonate and impart a color to the stone.

2. The process which comprises the treating of open textured stone surfaces comprising the application of a carbonate solution thereto followed by the application of a solution containing a metallic sulphate which will react with the carbonate to produce a colored carbonate on and in said surface.

3. The process which comprises the treatment of the surface of open textured stone by the application of a carbonate solution thereto, followed by the application of a solution containing metallic sulphates, and afterwards by the application of a solution of soft soap.

4. The process which comprises the treating of the surface of concrete by adding soluble alkali metal carbonate to the surface, and the application of a solution of zinc and aluminum sulphates and a sulphate which will react with the carbonate in the surface of the concrete to produce a color therein, followed by a treatment of soft soap.

5. The treatment of the surface of concrete with a solution consisting of zinc and aluminum sulphates and a sulphate for imparting a color to the surface.

6. A chemical solution for the treatment of concrete surfaces consisting of zinc, aluminum and iron sulphates.

7. The process which comprises the treating of the surface of concrete containing carbonates consisting in the application of a solution of zinc and aluminum sulphates and a sulphate which will react with the carbonate in the surface of the concrete to produce a color therein followed by a treatment of soft soap.

8. The process which comprises the treating of the surface of concrete consisting in applying a 20% solution of zinc and aluminum sulphates followed by a treatment of soft soap.

9. The process which comprises the treating of the surface of concrete consisting in applying a carbonate solution thereto, follower by the application of a 20% solution of zinc and aluminum sulphates and a sulphate which will react with the carbonate in and on the surface of the concrete to form a colored carbonate, and afterwards by a treatment of soft soap.

10. The process which comprises the treating of an open textured stone surface by applying a carbonate solution thereto, a solution containing zinc, aluminum and iron sulphates, and a solution of soap.

11. The process which comprises the treating of the surface of concrete consisting in applying a carbonate solution thereto, followed by the application of a solution of zinc and aluminum sulphates and a sulphate which will react with the carbonate in and on the surface of the concrete to form a colored carbonate, and afterwards by a treatment of soft soap.

In testimony whereof he affixes his signature.

DANIEL W. KESSLER.